United States Patent [19]

Ogle, Jr. et al.

[11] 4,257,444

[45] Mar. 24, 1981

[54] INSERT CHECK VALVE OR THE LIKE

[75] Inventors: Francis H. Ogle, Jr., Chardon; Ernest R. Koppl, South Euclid, both of Ohio

[73] Assignee: Transamerica DeLaval Inc., Princeton, N.J.

[21] Appl. No.: 27,846

[22] Filed: Apr. 6, 1979

[51] Int. Cl.³ .............................................. F16K 43/00
[52] U.S. Cl. .................................. 137/315; 137/454.2; 137/512.1; 137/515; 251/360
[58] Field of Search ............... 137/454.2, 454.6, 512.1, 137/515, 515.5, 515.7, 315; 251/360, 363; 285/321; 220/319; 292/256.6, 256.63

[56] References Cited

U.S. PATENT DOCUMENTS

| | | | |
|---|---|---|---|
| 2,427,260 | 9/1947 | Cowles | 285/321 X |
| 2,631,577 | 3/1953 | Carter | 251/363 X |
| 2,790,462 | 4/1957 | Ashton | 220/319 X |
| 3,122,159 | 2/1964 | Milo | 137/454.2 |
| 3,538,946 | 11/1970 | Hilshelmer | 137/515.5 X |
| 3,650,182 | 3/1972 | Phillips | 285/321 X |
| 3,687,157 | 8/1972 | Whitmer | 137/515 X |
| 3,937,441 | 2/1976 | Baumann | 137/454.2 X |
| 4,128,111 | 12/1978 | Hansen | 137/515.7 |
| 4,156,435 | 5/1979 | Norton | 137/454.5 X |

Primary Examiner—Harold W. Weakley
Attorney, Agent, or Firm—Hopgood, Calimafde, Kalil, Blaustein & Lieberman

[57] ABSTRACT

The invention contemplates a particular body construction and assembly for a check valve or the like whereby the entire valve assembly may be readily installed as a unit within the bore of standard pipe or conduit, or a standard fitting therefor. A single circumferentially extending radially inwardly open groove in the bore of the pipe, conduit or fitting, faces a corresponding radially outwardly open groove in the valve body, and stiffly compliant circumferentially extensive retainer element such as a wire of suitable gage substantially fills these grooves to retain the inserted valve in place. The retainer element is adapted for ready removability, to enable servicing or removal of the inserted valve, and the valve body is so externally characterized as to unambiguously assure valve installation in the correct direction of desired flow.

19 Claims, 8 Drawing Figures

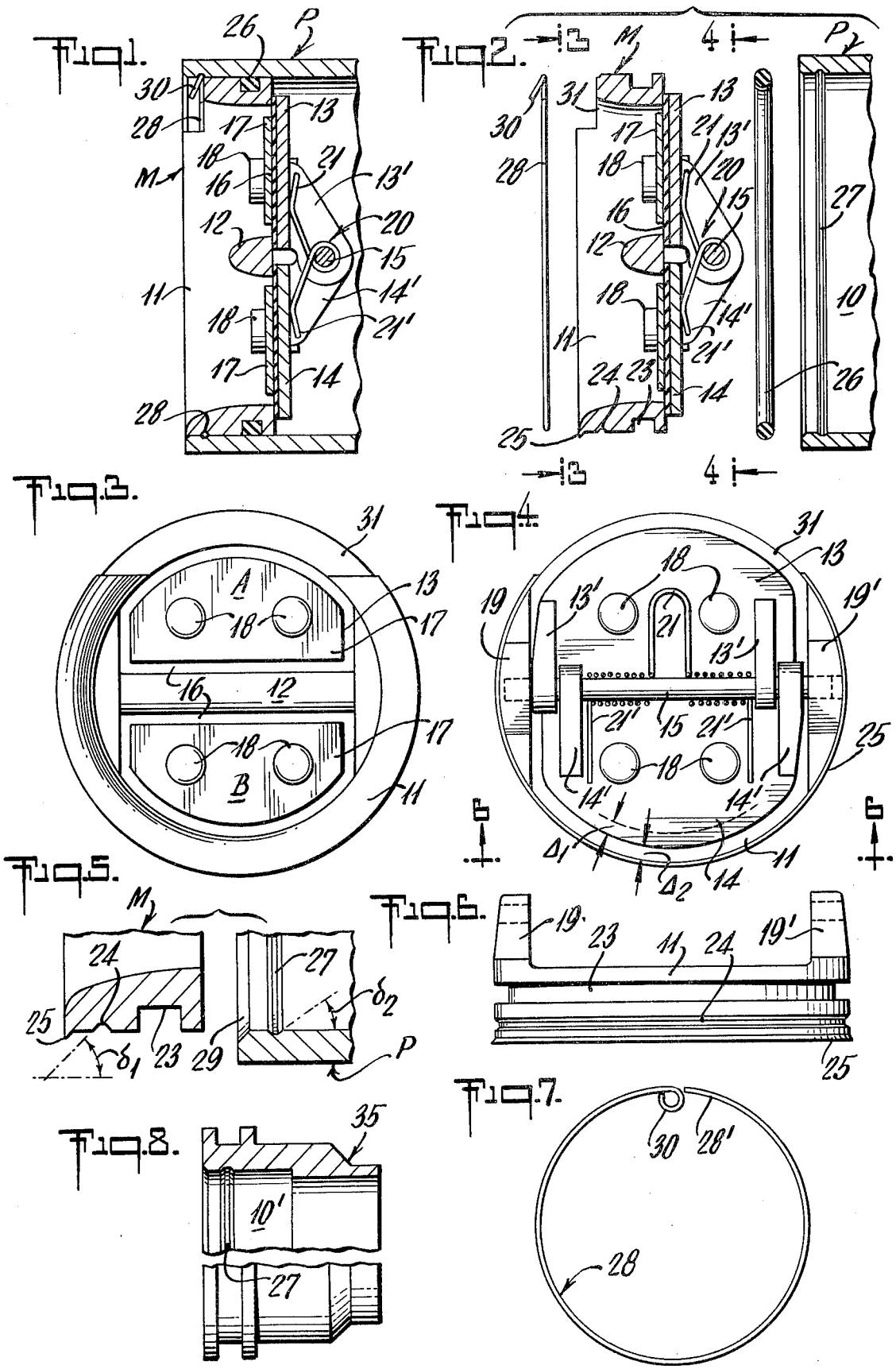

INSERT CHECK VALVE OR THE LIKE

BACKGROUND OF THE INVENTION

This invention relates to a body construction and assembly for a check valve or the like, particularly for installation at juncture of two pipes, conduits or fittings for carrying a fluid or fluid flow.

In many industrial applications, it is desirable to provide a check-valve or other valve function at one or more spaced locations in a pipe line or conduit for handling fluids. The check valve assures against back flow and provides a safety feature, in the event of line breakage. A customary way of installing such a check valve at connection of two lengths of pipe is by clamping the parallel flat end surfaces of such a valve between the opposed pipe flanges involved in completing the pipe joint, such a construction being exemplified by the check valve of U.S. Pat. No. 4,079,751 to Partridge, et al. However, it is clear that to provide such a check-valve or the like function in existing pipe, the pipe must either be equipped for flange connection, or flanges must be applied to the cut location selected for check-valve installation.

SUMMARY OF THE INVENTION

It is an object to provide an improved system of adapting a check-valve or the like function to a pipe, conduit or fitting for accommodation of fluid flow.

A specific object is to provide a valve-body module for check-valve or the like functions and readily adaptable to existing pipe conduit or fitting dimensions, without requiring structural addition thereto.

Another specific object is to achieve the above objects with a structure which does not require any change in length of existing connected pipe, conduit or fittings into which a check-valve or the like function is to be embodied.

A further specific object is to meet the above objects with valve-body configuration which is compatible with axial insertion in bore sizes that are standard and, therefore, universally encountered in industry.

It is also a specific object to provide such a construction as will enable removable application of one or more check-valve modules at selected flexibly connected points in the fuel-distribution and redistribution system of an aircraft.

It is a general object to meet the above objects with a construction which is rugged and reliable in operation, simple and foolproof as to installation and removal, and inherently less expensive than existing structures of comparable flow-handling capacity.

The foregoing objects and other features of the invention are realized by a cylindrically annular valve body sized for axial insertion into a standard pipe bore, the operative valve parts being fully contained within the geometrical cylinder of the body. A locally enlarged formation at one end of the body is designed for interference with the bore size which accommodates the geometrical cylinder, thus assuring against ambiguity in installation with respect to the intended direction of flow. And axially registering and radially facing grooves in the receiving bore and in the body cylinder are simultaneously engaged by a removably inserted wire to retain an installation of the insert valve in the bore.

DESCRIPTION OF A PREFERRED EMBODIMENT

A preferred embodiment will be illustratively described in conjunction with the accompanying drawings, in which:

FIG. 1 is a longitudinal sectional view of an insert check valve of the invention in installed position at one end of a pipe;

FIG. 2 is an axially exploded view of the parts of FIG. 1, prior to assembly;

FIGS. 3 and 4 are left-end and right-end views of the insert-valve unit of FIGS. 1 and 2, taken respectively at 3—3 and 4—4 of FIG. 2;

FIG. 5 is an enlarged fragmentary longitudinal sectional view of cooperating elements of FIG. 1, in axially exploded relation;

FIG. 6 is a view in elevation of the body of the insert valve of FIG. 1, taken from the aspect 6—6 of FIG. 4;

FIG. 7 is a plan view of a retainer element of FIG. 1; and

FIG. 8 is a broken view in side elevation, partly in longitudinal section, of a pipe fitting or ferrule adapted for installation of an insert check valve or the like of the invention.

Referring initially to FIGS. 1 and 2, the invention is shown in application to a check-valve module M which is bodily insertable into one end of the cylindrical bore 10 of a standard pipe or conduit P, to determine one-way flow in the left-to-right direction of the drawing. The check-valve module comprises a relatively thin cylindrical annulus 11 which has a cylindrical outer surface designed for relatively close but slip-fit reception in the bore 10. The inner-surface contour of the body annulus 11 is smoothly convergent to a valve-seat plane at the downstream end, and a diametrically extending seat post 12, integrally formed with the body annulus 11, extends diametrically across the annulus at the seat plane, dividing the body opening into two like opposed generally semicircular valve-seat openings A-B (FIG. 3). Two like valve members or petals 13-14 have offsetting arms 13'-14' by which they are independently hinged from a single hinge pin 15 which extends diametrically, at a location downstream from the valve-seat plane and parallel to the seat post 12. In the form shown, each valve petal 13 (14) is lined by an elastomeric pad or sheet 16, retained in place by a plate 17 and suitable fastening means 18.

Seated overlap of body 11-12 at the seating plane is peripherally continuous about each of the openings defined by the seat post 12, to the extent designated $\Delta_1$ in FIG. 4, thus leaving a radial clearance $\Delta_2$ between each petal 13 (14) and the adjacent cylindrical periphery of the valve body 11. At the diametrically opposite regions of seat-post juncture with body 11, the clearance $\Delta_2$ is slightly enlarged, for greater structural integrity and to integrally accommodate local downstream-projecting mounts 19-19' for the respective ends of hinge pin 15. A single spring 20 with like but oppositely coiled wraps around pin 15 is characterized by tangent arms 21-21' by which it provides constant bias force to urge the valve members 13-14 to the closed position shown.

To secure and seal the indicated slip-fit to bore 10, the external cylindrical surface of body 11 is characterized by a radially outwardly open and circumferential seal groove 23 near the seating plane, at effectively the downstream end of the body 11, and by radially outwardly open circumferential retainer groove 24 located more near the upstream end of body 11. And a circumferential enlargement or lip 25 at the upstream end is sized for interference with the bore 10, thus assuring unambiguous installation of module M in pipe P, passing flow into pipe P but blocking backward flow from pipe P via module M. A standard O-ring 26 in groove 23 coacts with the bore 10 to seal the described slip fit. Near its open end, the pipe bore 10 has a radially inwardly open circumferential retainer groove 27, and a stiffly compliant retainer element 28 extends circumferentially to lap the retainer grooves 24–27 when in radially facing axial registry.

Referring to FIG. 5 for greater detail, the lip 25 will be seen to substantially compliment the bore chamfer 29 by which the bore 10 of a conventional pipe, conduit or fitting is terminated, thus permitting an inserted module M to be received virtually flush with the existing end of an already installed pipe P. Installation of module M therefore does not dictate any change in length (or installed position) of pipe P or any change in length (or installed position) of a next-adjacent compatible pipe (not shown) to which the illustrated end of pipe P may have been previously detachably connected.

Each of the oppositely facing retainer grooves 24–27 is peferably of trapezoidal section, with outwardly flaring side walls designed preferably to urge or cam the retainer 28 radially inwardly into the body groove 24, in the presence of any force tending to axially displace module M within its retained location. As shown, the flaring slopes $\delta_1$ of the walls of groove 24 are at substantially 60 degrees to the central axis of module M; and the corresponding flare slopes $\delta_2$ of the bore groove 27 are materially less, in the range 25 to 45 degrees. The reason for preferring a convergence ($\delta_1-\delta_2$) as between one flare on one retainer groove (24) and the oppositely facing flare on the other retainer groove (27) is to establish an environment which will inherently assure concentricity in the positioning of retainer element 28 with respect to the axis of module M. And the range of $\delta_1$ to achieve this relation is preferably within 45 to 70 degrees, with the difference $\delta_1-\delta_2$ being in the range 25 to 35 degrees, all stated for the case of a wire retainer 28 of circular section having a section radius which is substantially the depth of body groove 24.

To accommodate retainer 28, for manipulated insertion and/or removal, one end thereof is locally bent, both radially inwardly and in a single axial direction, as shown for the bent manipulating end loop 30, see FIGS. 2 and 7. Also, an angularly localized region of the upstream end of body 11 is cut away or recessed, as shown for the chordally milled recess 31, of axial extent to at least intersect the body groove 24, thus exposing a localized region via which the lead end 28' of retainer 28 may be introduced into the combined section of grooves 24–27 when in axial registry; preferably, the angular extent of recess 31 is a relatively small fraction of the peripheral extent of body 11 and is localized between points of seat-post juncture to body 11, as shown for example in FIG. 3.

Simple angular advance of retainer 28 into grooves 24–27 will draw the end 30 into greater axial proximity and axially stressed engagement with the upstream end of body 11, as retainer-insertion progresses throughout the range of circumferential registry of grooves 24–27. Eventually, the manipulating loop 30 will clear the edge of recess 31, allowing the loop end 30 of the retainer to snap into home position with recess 31, for permanent retention therein. Preferably, the arcuate radial-plane face of recess 31 substantially coincides with the downstream intercept of groove 24 with the outer cylindrical surface of body 11 so that even within the limited arcuate extent of recess 31, there may be a meaningful arcuate contribution of axial-retaining support (via retainer 28 and the upstream flared end of groove 27), for example, in response to valve-checking opposition to backward flow of liquid in pipe P.

The described embodiment of the invention will be seen to achieve all stated objects and to provide a hitherto unavailable flexibility and range of application of a check-valve (or other flow-operated-valve) function to given fluid systems and installations. The only operation necessary on standard pipe, to install the insert valve, is to create the retainer groove 27 in the bore 10, a relatively simple manual-tool operation, in situ if necessary. The modular insert of the invention is most usefully applied in fuel lines within an aircraft, for example at detachable flexible connection of discrete lengths of such lines within a wing, in which event FIG. 8 illustrates that the retainer groove 27 may be provided in the existing counterbore 10' of a standard commercial ferrule 35 via which a typical such flexible connection is made, it being noted that the depicted ferrule is illustratively of the weldable variety, Code 903B, a product of Wiggins Connectors Division of De Laval Turbine, Inc., Los Angeles, Calif.

While the invention has been described in detail for a preferred form, it will be understood that modifications may be made without departure from the claimed scope of the invention.

What is claimed is:

1. In combination, first means of conducting fluid flow and including a circular bore at an open end thereof, said bore having a circumferentially continuous annular groove therein at a location axially offset from said open end, and an insert valve removably seated in said bore; said insert valve comprising an annular body with a cylindrical outer surface sized for support in said bore in axial overlap with said groove, an externally open circumferential groove in said body and having sectional proportions substantially matching but radially opposed to those of the bore groove, one end of said body being locally recessed to an axial extent which includes said body groove, the angular limits of said recess being less than the remaining circumferential extent of said body groove, and a stiffly compliant circumferentially extensive retainer element substantially filling one of said grooves, and at least partially filling the other of said grooves, said retainer element being removably insertable via said recess into the annular volume defined by and between said grooves when in axial registry.

2. The combination of claim 1, in which said insert valve is of a variety designed for primary flow from an inlet end to an outlet end, the inlet end of said outer surface being radially larger than the cylindrical remainder of said outer surface, to the extent that interference between said inlet end and the bore of said first means will prevent an inadvertent directionallly incorrect assembly of said combination.

3. The combination of claim 2, in which said insert valve is a check valve.

4. The combination of claim 1, in which said body has a circumferential continuous radially outward seal-ring groove in its outer surface at an axial location offset from said first-mentioned groove.

5. In combination, first means of conducting fluid flow and including a circular bore at an open end thereof, said bore having a circumferentially continuous annular groove therein at a location axially offset from said open end, and an insert valve removably seated in said bore; said insert valve comprising an annular body with a cylindrical outer surface sized for support in said bore in axial overlap with said groove, an externally open circumferential groove in said body and having sectional proportions substantially matching but radially opposed to those of the bore groove, and a stiffly compliant removable circumferentially extensive retainer element substantially filling one of said grooves, and at least partially filling the other of said grooves, one end of said body being locally recessed to an axial extent which includes said body groove, the angular limits of said recess being less than the remaining circumferential extent of said body groove, said retainer element being a circumferentially extending wire of greater circumferential extent than said body groove.

6. The combination of claim 5, in which one end of said wire is locally bent in one axial direction and radially inward, thereby facilitating insertion and removal of said wire upon angular manipulation thereof with respect to said body.

7. In combination, first means of conducting fluid flow and including a circular bore at an open end thereof, said bore having a circumferentially continuous annular groove therein at a location axially offset from said open end, and an insert valve removably seated in said bore; said insert valve comprising an annular body with a cylindrical outer surface sized for support in said bore in axial overlap with said groove, an externally open circumferential groove in said body and having sectional proportions substantially matching but radially opposed to those of the bore groove, and a stiffly compliant removable circumferentially extensive retainer element substantially filling one of said grooves, and at least partially filling the other of said grooves, said body being cylindrically annular and integrally including a diametrically extending seat post dividing the opening of said body into two like opposed generally semicircular valve-seat openings to share fluid flow in a single downstream direction through said body, two valve members hinged to said body and respectively movable to open and close said openings, the upstream end of said body being axially recessed at least to intersect with said body groove, said axial recess extending between angular limits which are between the spced locations of seat-post juncture to said body, said retainer element being of circumferential extent to substantially fill the remainder of said body groove upon circumferential displacement upon insertion via said recess.

8. The combination of claim 1, in which said body groove is of substantially trapezoidal section, flaring in the radially outward direction.

9. The combination of claim 1, in which said groove in the bore of said first means is of substantially trapezoidal section, flaring in the radially inward direction.

10. The combination of claim 9, in whcih said body groove is of substantially trapezoidal section, flaring in the radially outward direction, one flare of one groove and the axially opposed flare of the other groove being of substantially the same conical slope with respect to the central axis of said combination, said retainer element being a wire of sufficiently larger circular section to develop a line contact at tangency with each of said axially opposed flares in reaction to an axially compressive load of said body on said first means via said wire and said opposed flares.

11. The combination of claim 10, in which said one flare in the body groove is at a greater angle to the axis of said combination than is the axially opposed flare of the other groove.

12. The combination of claim 11, in which the remaining axially opposed flares of the respective grooves are of substantially said slopes but in the opposite axial direction.

13. The combination of claim 11, in which said slope for the flares of said other groove is in the range of 25 to 45 degrees.

14. The combination of claim 10, in which said slope for the flare of said other groove is substantially 30 degrees.

15. In a check valve as an article of manufacture, comprising a cylindrically annular body which includes a diametrically extending seat post dividing the opening of said body into two like opposed generally semicircular valve-seat openings to share fluid flow in a single downstream direction through said body, and two valve members hinged to said body to open and close said openings, the improvement wherein the external surface of said body is a cylinder having a circumferential radially outwardly open seal-ring groove near one axial end, a radially outward lip formation near the other end, and a radially outwardly open retaining-ring groove between said seal-ring groove and said lip formation, said other end of said body being locally recessed to an axial extent which includes said retaining-ring groove but which is axially short of intercepting said seal-ring groove, the angular limits of said recess being less than the remaining circumferential extent of said retaining-ring groove.

16. The improvement of claim 15, wherein said lip formation is at the upstream end of said body.

17. The improvement of claim 15, wherein said seat post extends axially to the downstream end of said body to establish a single end plane of said body for valve-member seating, said valve members in seated position having radial clearance with the seat-plane periphery of said body, said body integrally including two downstream-projecting hinge-mount formations within said radial clearance and at diametrically spaced locations which are respectively adjacent the locations of seat-post juncture to the annulus of said body, the hinged connection of said valve members to said body being on a single diametrically extending axis via said hinge-mount formations.

18. The combination of claim 1, in which said first means is a metal pipe element.

19. The combination of claim 1, in which said first means is an annular ferrule adapter for connection to fluid-flow conduit means.

* * * * *